Jan. 11, 1966   A. A. MATTHIES   3,228,204
REFRIGERATION CONTROL FOR DEFROSTING
Filed July 3, 1963                     2 Sheets-Sheet 1

INVENTOR.
ALAN ARTHUR MATTHIES
BY *Bayard H. Michael*
ATTORNEY

INVENTOR.
ALAN ARTHUR MATTHIES
BY Bayard H. Michael
ATTORNEY

United States Patent Office 3,228,204
Patented Jan. 11, 1966

3,228,204
REFRIGERATION CONTROL FOR DEFROSTING
Alan Arthur Matthies, Milwaukee, Wis., assignor to Controls Company of America, Melrose Park, Ill., a corporation of Delaware
Filed July 3, 1963, Ser. No. 292,573
18 Claims. (Cl. 62—140)

This invention relates to a refrigeration control for controlling the accumulation of frost on the coils of a refrigerating system, and more particularly to a self-cycling control which employs a bimetal to move a sensing member into and out of engagement with a coil in response to intermittent heating of the bimetal.

The present invention is an improvement of the control disclosed in my copending application Serial No. 53,172, filed on August 31, 1960, now Patent No. 3,134,238. The improvement in structure and function primarily lies in the manner of actuating the defrost control switch of the control. In the copending application the motion of the bimetal was transferred to the defrost control switch, whereby the latter was caused to be tripped when the sensor encountered a predetermined thickness of frost accumulation. In the control embodying the present invention the defrost control switch is still actuated when the sensor encounters a predetermined thickness of frost; however, any mechanical connection between the bimetal and the defrost control switch is eliminated. By virtue of this improvement a switching mechanism which was fairly hard to manufacture, assemble, and calibrate has been eliminated from the design, resulting in a material reduction of the control's cost.

In view of the above, the principal object of this invention is to provide a simplified self-cycling refrigeration control by eliminating any mechanical switching connection between the sensor bimetal and the defrost control switch.

To attain this object, I mount the sensor bimetal and the bimetal heater within a housing and rely upon the ambient temperature within the housing to control the actuation of the defrost control switch. The sensor bimetal and the heater cooperate to intermittently energize and de-energize the heater and to thereby cause the sensor bimetal to repeatedly move the sensor in and out of engagement with the coil. Thus the interior ambient of the housing is alternately heated and permitted to cool with each sensing cycle. However, because of this cycling, the interior ambient of the housing is maintained above the temperature outside the housing. When the sensor encounters the predetermined frost thickness, it de-energizes the heater and thereby stops the alternate heating and cooling of the housing and causes the ambient within the housing to drop. I utilize this drop in temperature to close the defrost switch by employing a second bimetal which is moved in response to this drop to close the normally open contact of the defrost control switch. Once the defrost cycle is started, the bimetal heater is electrically eliminated from the refrigeration circuit and the rising external ambient is the only element capable of heating the second bimetal to cause the same to open the defrost control switch. After the external ambient has risen to a predetermined temperature, the defrost control switch is opened and the sensor bimetal and heater are again switched into the control circuit. Thus the control embodying the present invention is able to initiate a defrost cycle via a predetermined thickness of frost and to terminate the frost cycle via the temperature rise of the frost forming surface and the surrounding air, thereby being completely independent of hot gas temperature, voltage variations, or frost conditions.

Another object of this invention is to provide a defrost circuit for a refrigerator, which circuit incorporates the above described defrost control.

Other object and advantages will be pointed out in or be apparent from the specification and claims, as will obvious modifications of the several embodiments shown in the drawings, in which:

Figure 1:
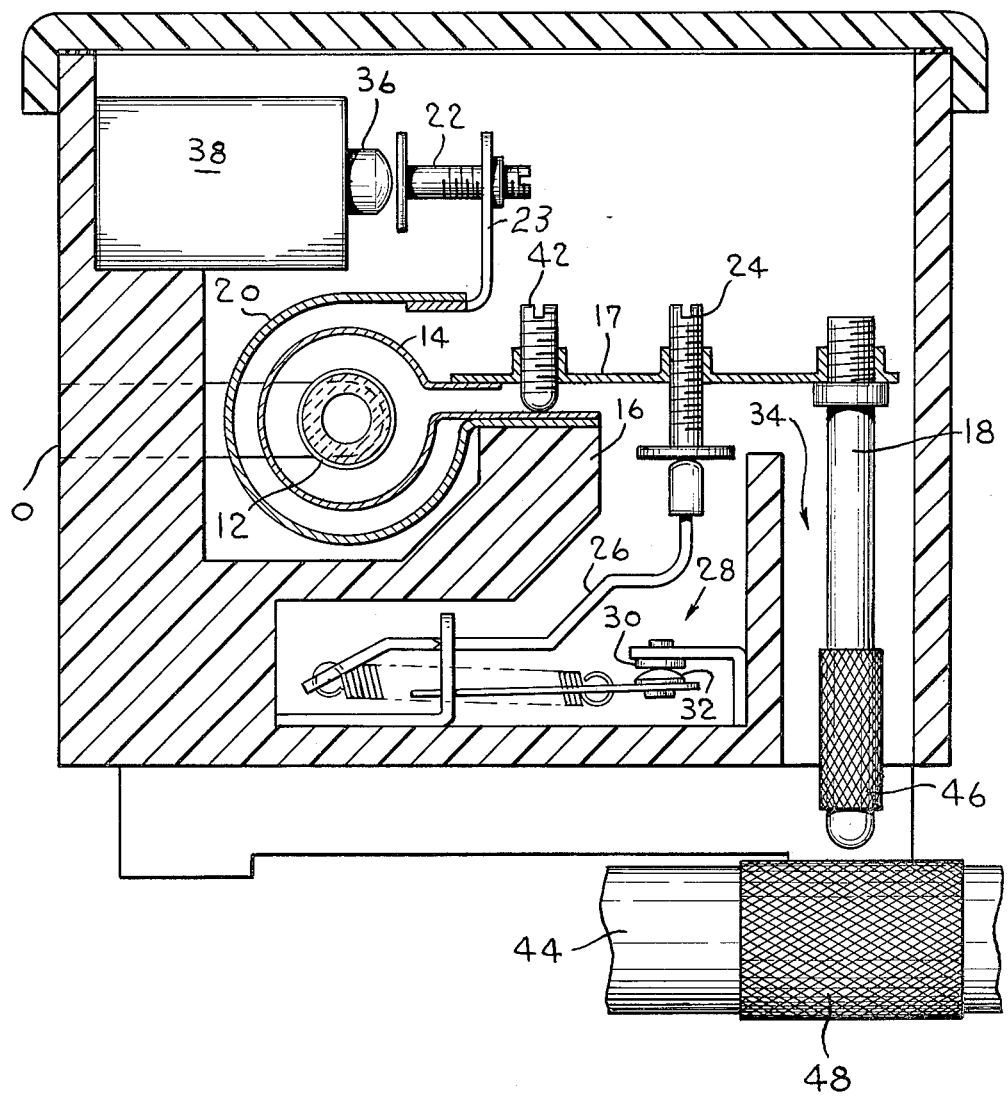
FIG. 1 is a cross sectional view of the defrost control embodying the present invention with the parts being shown in a position when the bimetal heater is energized and the defrost control switch is open.

Referring to the drawings, the defrost control embodying the present invention is comprised of a housing 10 made of low heat conducting material and containing heater 12, a first bimetal 14 mounted on support 16 and connected by means of bracket 17 to the sensing member 18, and a second bimetal 20 mounted on support 16 and carrying at its free end plunger 22 adjustably mounted in bracket 23. The bracket 17 carries adjustable plunger 24 with contacts upwardly biased toggle arm 26 of snap action switch 28 which closes contact 30 and 32 to energize heater 12 and which snaps to the open position to deenergize the heater after toggle arm 26 is permitted to travel a predetermined distance upwardly from the position shown in FIG. 1. The particular distance of upward travel required is dependent upon the geometry of the arm and the related switch parts and may be accurately predetermined to suit the particular purpose. The switch as such is well-known in the art and therefore will not be described in detail herein.

At the beginning of a sensing cycle, sensing member 18 is retracted in chamber 34 of the housing, switch 28 is open, and the heater 12 is de-energized. At this time the ambient within the housing 10 drops (because at the end of the last sensing cycle, heater 12 was energized) and bimetal 14 warps towards the heater 12 causing corresponding downward motion of the sensing member 18 and of the plunger 24. Assuming insufficient frost accumulation to initiate a defrost cycle, the downward travel will continue until plunger 24 will have moved toggle arm 26 sufficiently downwardly to cause switch 28 to close and to energize heater 12. Within a very short time thereafter, heater 12 will have generated enough heat to warp bimetal 14 outwardly and thereby move the sensing member 18 and plunger 24 in the upward direction. Of course, at the same time the heater will also cause a rise in the ambient within housing 10. After a predetermined upward movement, switch 28 will again snap to the open position, thereby de-energizing the heater 12 and initiating the start of the next sensing cycle. During this repeated cycling (energization and de-energization of heater 12), the ambient within the housing will always be maintained above the temperature which is required to move bimetal 20 sufficiently to cause plunger 22 to depress button 36 of the defrost control switch 38.

When the frost accumulation reaches a thickness at which a defrost cycle is to be initiated, the downward movement of the sensing member 18 will be stopped by the frost accumulation before the plunger 24 has moved sufficiently downwardly to close switch 28. At this point the further downward movement of the bimetal will be stopped and the ambient within the housing 10 will drop below the temperature normally maintained within the housing by the repeated energization of heater 12. This drop in the ambient temperature will cause bimetal 20 to warp outwardly thereby moving plunger 22 to depress button 36 of the defrost control switch 38 and thereby opening a normally closed contact 40 (FIGS. 2–4) to switch out the bimetal heater 12 from the refrigeration circuit and to close a normally open contact 42 to initiate the defrost cycle. During the defrost cycle, the exterior ambient will rise resulting in a corresponding rise in the ambient within the housing 10. After the ambient has risen to a temperature deemed sufficient for the completion of the defrost cycle, bimetal 20 is caused to warp inwardly, thereby opening contact 42 to terminate the defrost cycle and closing contact 40 to again render the control responsive to the heater 12.

The downward movement of bracket 17 is limited by threaded feeler rod 42 which is mounted in bracket 17 to engage support 16 and to limit the downward travel of the sensing rod to a point at which the switch 28 closes to energize the heater 12. The sensing member 18 and the coil 44 are both provided with screens 46 and 48 respectively which by capillary action drain water accumulations which in absence of the screens might remain on these parts throughout the defrost cycle and could freeze into ice granules which would prematurely block the downward travel of sensing member 18 and thus initiate a false defrost cycle.

Figure 2:
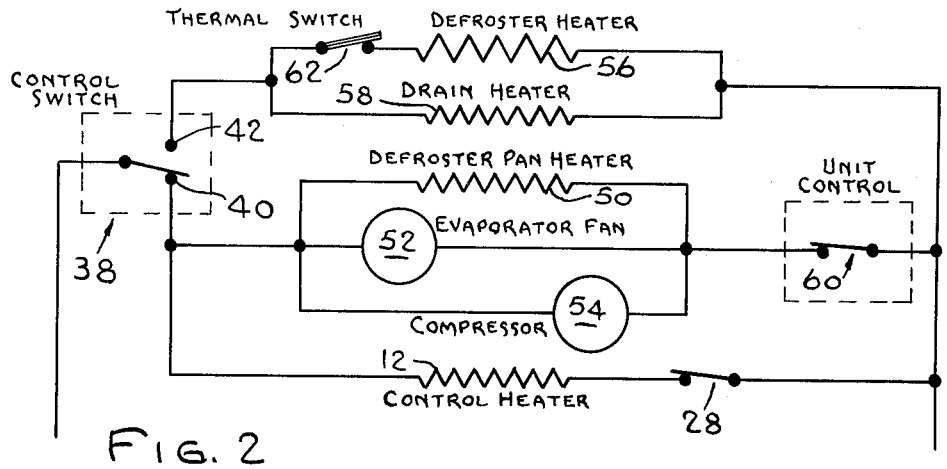
FIG. 2 is an electric defrost circuit embodying the present invention.

An electric defrost circuit is shown in FIG. 2 wherein the defrost control switch 38 is in a position closing normally closed contacts 40 (bimetal 20 warped inwardly due to sufficiently high ambient within housing 10) and showing switch 28 in the closed position thereby energizing bimetal heater 12. The circuit is shown as it appears during a refrigeration cycle. The switch 28, of course, opens and closes until the predetermined frost accumulation has been sensed, at which time it will remain in the open position, thereby maintaining the bimetal heater 12 denergized and causing the defrost control switch 38 to break contact 40 and make normally open contact 42 to initiate the defrost cycle. At this time the defrost pan heater 50, the evaporator fan 52, and the compressor 54 will be switched out of the refrigeration circuit and the defrost heater 56 and the drain heater 58 will be energized, thereby causing the ambient around the coils to rise. After a time period sufficient to cause the frost accumulation on the coils to melt, the ambient around the coils and thus within housing 10 will have risen and the control switch will break contact 42 and make contact 40 thereby again returning the defrost fan heater 50, evaporator fan 52 and compressor 54 to the circuit and also again switching the heater 12 and switch 28 into the refrigeration circuit. The refrigeration circuit is shown to contain a unit control switch 60 which controls the temperature within the refrigerator during the refrigeration cycle but which has no bearing the operation of the defrost control.

The modification of this invention is to incorporate a thermal switch 62 which will open before the defrost control switch 38 opens contact 42 to thereby de-energize the defrost heater 56, yet maintain the drain heater 58 energized. The latter will be de-energized as the defrost control switch responds to further rise in the ambient within the housing and moves from contact 42 to contact 40. This feature permits a sufficient time interval for the defrost water to drain before the refrigeration cycle is initiated and eliminates the freeze-up of the drain water as has been experienced with control circuits known heretofore.

Figure 3:
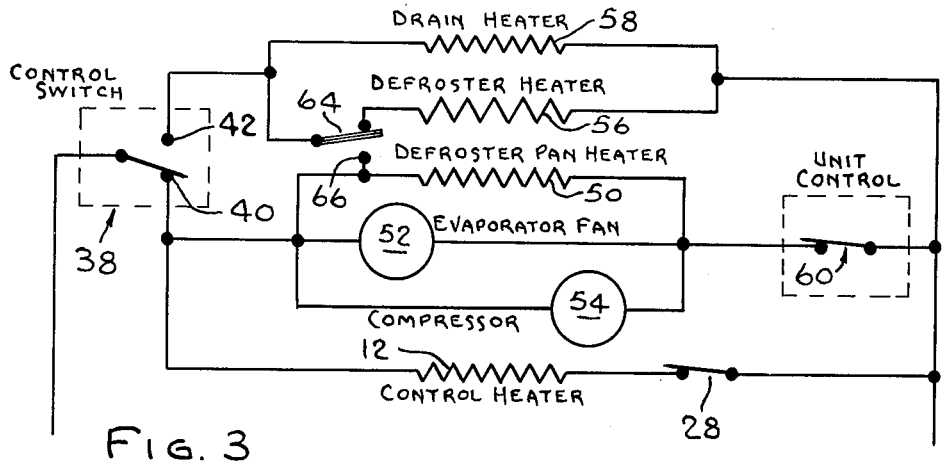
FIG. 3 is a modification of the circuit shown in FIG. 2.

FIG. 3 shows a modified circuit wherein a thermal switch 64 is normally closed to maintain defrost heater 56 within the defrost circuit but which opens while the defrost control switch is still on contact 42, and makes contact 66 to thereby energize the defrost pan heater 50, evaporator fan 52, compressor 54, and bimetal heater 12 and its cooperating switch 28. Thus, this circuit is operable to initiate a defrost cycle in the same manner as described with respect to the circuit shown in FIG. 2; however, the rise in ambient causes an initiation of the refrigeration cycle by means of thermal switch 64 independent of the defrost control switch 38. This feature causes the drain heater 58 to remain energized until the defrost switch moves from contact 42 to contact 40, yet initiates the refrigeration cycle prior to this movement of the defrost control switch. With the initiation of the refrigeration cycle, the heater 12 is again alternately energized, thereby causing a rise in the ambient within housing 10 and causing the defrost control switch to open contact 42 and close contact 40. Thereafter, the drop in the temperature within the refrigerator will cause thermal switch 64 to break contact 66 and again assume the position shown in FIG. 3.

Figure 4:
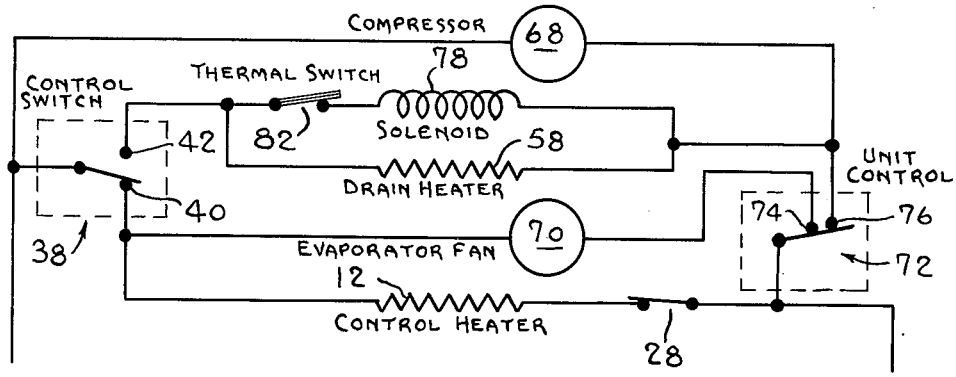
FIG. 4 is a hot gas defrost circuit embodying the present invention.

The hot gas defrost circuit shown in FIG. 4 is in the sensing condition with the compressor 68 and evaporator fan 70 being energized by virtue of unit control switch 72 closing contacts 74 and 76. The unit control cycles in the usual manner between an open and closed position to maintain a preset temperture within the refrigerator. As a defrost cycle is initiated, the defrost control switch breaks contact 40 and makes contact 42. If, at this time, the unit control switch 72 is closed, the hot gas solenoid 78 and drain heater 58 are energized while the evaporator fan 70 and heater 12 remain de-energized. If the control is switch is not closed at this time, the actual defrosting is delayed until the unit control switch closes. Thus, the unit control serves to supply power to the compressor 68, both during the defrost, as well as refregeration, cycles while maintaining the evaporator fan energized only during the refrigeration cycles. Once a sufficient ambient temperature is reached within the refrigerator to indicate completion of the defrost cycle, the defrost control switch 38 breaks contact 42 and makes contact 40 to again connect the heater 12 for energization and to return the refrigeration circuit to the control of the unit control.

A thermal switch 82 may be provided to de-energize the hot gas solenoid while the defrost control switch still makes control 42 and thus maintains drain heater 58 energized. This feature is identical in function and advantages to that described above in connection with thermal switch 82 of the circuit shown in FIG. 2.

Although but several embodiments of the present invention have been illustrated and described, it will be apparent to those skilled in the art that various changes and modifications may be made therein without departing from the spirit of the invention or from the scope of the appended claims.

I claim:
1. A defrost control comprising,
   a housing,
   sensing means connected to said housing and operable to sense the accumulation of frost on a surface,
   electric heating means connected to said housing to affect the temperature therein and operable at times when the frost accumulation is below a predetermined level to maintain the ambient temperature within said housing at a level above the ambient temperature outside said housing, said heating means being incapable when said predetermined frost accumulation has been attained to maintain the temperature within said housing above said level thereby causing a drop in temperature in said housing, and
   switch means connected to said housing to be effected by the temperature therein and being responsive to the drop in the ambient temperature within said housing to initiate a defrost cycle, said switch means being responsive to a rise in the ambient temperature which is occasioned by said defrost cycle to terminate said defrost cycle.

2. A defrost control according to claim 1 wherein said switch means is operable in response to said drop in ambient temperature to switch said electric heating means out of circuit normally energizing said electric heating means.

3. A defrost control according to claim 2 wherein said switch means is operable to switch said electric heating means in a circuit for energization of said heating means in response to said rise in ambient temperature occasioned by said defrost cycle.

4. A defrost control for a refrigerating system comprising,
a housing,
a sensing member,
a heat motor connected to said sensing member and operable during the refrigeration cycle to move said sensing member in and out of a sensing portion of a surface, said heat motor being mounted in said housing and maintaining the ambient temperature within said housing at a level above the ambient temperature outside of said housing during said refrigeration cycle,
a defrost control switch,
temperature responsive means mounted in said housing and connected to said control switch to effect movement of said switch between a defrost cycle position and a refrigeration cycle position, said temperature responsive means permitting said defrost control switch to be in said refrigeration cycle position when said ambient temperature within said housing is at said level, said heat motor operation being hindered when said seeing member encounters a predetermined thickness of frost accumulation on said surface and thereby permitting said ambient temperature to drop below said level, said temperature responsive means causing said defrost control switch to move to said defrost cycle position in response to the drop in the ambient temperature within said housing below said level.

5. A defrost control device according to claim 4 wherein said heat motor comprises bimetal means, a heater, and a switch, and wherein said bimetal means is temperature responsive means operable to close and open said heat motor switch to alternately energize and de-energize said heater and thereby cause said bimetal means to move said sensing member in and out of said sensing position.

6. A defrost control according to claim 5 wherein said defrost control switch, when in said refrigeration cycle position, closes a contact to connect said heater for energization and opens said contact when it is moved to said defrost cycle position.

7. A defrost control according to claim 6 wherein said temperature responsive means is responsive to the rise in ambient temperature outside of said housing during the defrost cycle to thereby cause said defrost control switch to move to said refrigeration cycle position and to close said contact and to thereby connect said heater for energization.

8. A defrost control according to claim 5 wherein said bimetal means moves said sensing member toward said surface when said heater is de-energized and move said sensing member away from said surface when said heater is energized.

9. An electric refrigeration defrost circuit having refrigeration components which are energized during the refrigeration cycle and having a defrost and a drain heater, comprising in combination,
a heater,
a bimetal switch operable to cycle between an open and closed position to thereby periodically energize and de-energize said heater,
means responsive to a predetermined accumulation of frost on the refrigeration parts to stop said cycling of said bimetal switch and to maintain said switch in an open position to thereby cause said heater to remain de-energized, and
a defrost control switch normally closing a first contact to connect said heater for energization, said defrost control switch being thermally responsive to the de-energization of said heater when said bimetal switch stops said cycling to move from said first contact and energize the defrost and drain heaters and to thereby initiate a defrost cycle.

10. A defrost circuit according to claim 9 wherein said defrost control switch is thermally responsive to the rise in ambient temperature occasioned by said defrost cycle to terminate said defrost cycle.

11. A defrost circuit according to claim 10 wherein said defrost control switch closes said first contact when it terminates said defrost cycle.

12. A defrost circuit according to claim 9 including a second bimetal switch which connects the defrost heater for energization when said defrost control switch initiates said defrost cycle, said second bimetal switch opening in response to the rise in ambient temperature which is occasioned by the defrost cycle to de-energize the defrost heater, and said defrost control switch opening to de-energize the drain heater upon further rise in said ambient temperature.

13. A defrost circuit according to claim 12 wherein said defrost control switch closes said first contact when it terminates said defrost cycle.

14. A defrost circuit according to claim 9 including a second bimetal switch which connects the defrost heater for energization when said defrost control switch initiates said defrost cycle, said second bimetal switch opening in response to the rise in ambient temperature occasioned by the defrost cycle to de-energize the defrost heater, also energizing the refrigeration components and said heater in response to said rise in ambient, said defrost control switch being thermally responsive to said energization of said heater to de-energize the drain heater and to close said first contact to thereby connect said refrigeration components and said heater for energization, said second bimetal switch closing after the last mentioned actuation of said defrost control switch.

15. A hot gas defrost circuit for a refrigerator having a compressor, an evaporating fan, a hot gas solenoid, and a drain heater, comprising in combination,
a heater,
a bimetal switch operable to cycle between an open and a closed position to thereby periodically energize and de-energize said heater,
means responsive to a predetermined first accumulation on the refrigerator parts to stop said cycling of said bimetal switch and to maintain said switch in an open position to thereby cause said heater to remain de-energized,
a defrost control switch normally connecting said heater and the evaporator fan in the defrost circuit, said defrost control fan being thermally responsive to the de-energization of said heater when said bimetal switch stops said cycling to switch said heater and the evaporator fan out of the defrost circuit and to switch the hot gas solenoid and drain heater into the defrost circuit to thereby initiate the defrost cycle, and
a unit control switch operable to energize said compressor during the defrost cycle.

16. A defrost circuit according to claim 15 wherein said defrost control switch is thermally responsive to the rise in the ambient temperature occasioned by said defrost cycle to terminate said defrost cycle.

17. A defrost circuit according to claim 15 including a second bimetal switch which connects the hot gas solenoid for energization when said defrost control switch initiates said defrost cycle, said second bimetal switch opening in response to the rise in ambient temperature which is occasioned by said defrost cycle to de-energize the solenoid, and said defrost control switch opening to de-energize the drain heater upon a further rise in said ambient temperature.

18. A defrost control for a refrigeration system of the type having refrigeration and defrost cycles, comprising:

control means responsive to its ambient temperature and operable to be actuated upon change in said ambient temperature past a predetermined temperature level, said control means means adapted to be connected to a refrigeration system and to affect the cycling of the refrigeration system upon actuation of said control means;

a sensing means operable to indicate frost accumulation conditions of the refrigeration system; and temperature control means responsive to said sensing means and maintaining said ambient temperature at a level other than said predetermined level, said temperature control means causing said ambient temperature to change past said predetermined level when said sensing means indicates a predetermined frost accumulation condition to thereby actuate said control means.

References Cited by the Examiner

UNITED STATES PATENTS

| | | | |
|---|---|---|---|
| 2,229,181 | 1/1941 | Leilich | 62—140 |
| 2,904,968 | 9/1959 | Spencer | 62—140 |
| 3,033,004 | 5/1962 | Matthies | 62—140 |
| 3,063,249 | 11/1962 | Matthies | 62—140 |

ROBERT A. O'LEARY, *Primary Examiner.*